WIDE BAND AUTOMATIC FREQUENCY CONTROL SYSTEMS

Filed Dec. 27, 1956 2 Sheets-Sheet 1

Inventors
OSCAR SHAPIRO
ROY E. TROELL
By
Attorney

Feb. 9, 1960 O. SHAPIRO ET AL 2,924,783

WIDE BAND AUTOMATIC FREQUENCY CONTROL SYSTEMS

Filed Dec. 27, 1956 2 Sheets-Sheet 2

Inventors
OSCAR SHAPIRO
ROY E. TROELL
By Percy P. Lantzy
Attorney

Patented Feb. 9, 1960

2,924,783

WIDE BAND AUTOMATIC FREQUENCY CONTROL SYSTEMS

Oscar Shapiro, Nutley, and Roy E. Troell, Ridgewood, N.J., assignors to International Telephone and Telegraph Corporation, Nutley, N.J., a corporation of Maryland Application December 27, 1956, Serial No. 630,906

3 Claims. (Cl. 331—4)

This invention relates to automatic frequency control systems and more particularly to a system for locking in frequency difference signals over very wide frequency ranges.

In high frequency operations frequency stabilization becomes increasingly difficult because of the greater sensitivity of the systems involved, and where phase comparators or discriminators are used for developing correction voltages necessary to control the frequency of a variable frequency source, the range of frequencies or locking in range is necessarily restricted by the component parts of such discriminators. In general phase comparators compare two signal frequencies, one a standard and the other variable to produce a voltage output functionally related to the frequency difference. The developed voltage is then utilized to control the variable frequency source until it reaches the same frequency as the standard. This phenomena is generally known as pulling in, the comparator in effect behaving as a mixer to produce a difference frequency necessary to correct the drifting variable frequency source. On the other hand, when the frequencies compared are the same, but merely differing in phase, the comparator acts as a true phase discriminator to produce a D.C. voltage which in turn locks the variable frequency source to the standard frequency at some constant phase difference.

An object of this invention is to provide an improved automatic frequency control system.

Another object is to provide an automatic frequency control system having very wide lock-in range.

A still further object is to provide an automatic frequency control system with alarm indication means for lock-in failure.

A feature of our invention is to provide means, which are initiated when the compared frequencies are out of pull-in range of the phase comparator, to cause the variable frequency source to sweep over a range of frequencies at a given rate until it reaches a frequency within the pull-in range of the phase comparator. The developed voltage by the comparator, when the compared frequencies are within pull-in range, is used to lock-in the variable frequency source, and simultaneously therewith to disable or neutralize the means which initiated the sweeping action of the variable frequency oscillator.

Another feature of the invention is an alarm indication which becomes operative in the event of lock-in failure, or when the system is not locked-in, by the detection of the initiating means which gave rise to the variable frequency source sweeping action.

Further objects, features and advantages of the invention will become apparent from a reading of the claims and the following description wherein:

Figure 1:
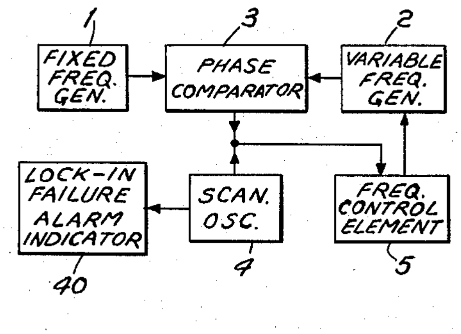
Fig. 1 shows in block-form the component parts of the frequency control system according to the invention.

Referring to Fig. 1 there is shown in block form a system in general for controlling the drift or frequency variation of a variable frequency source from a given selective frequency. A fixed frequency source 1, preferably crystal controlled with a minimum amount of drift characteristics is compared with a variable frequency source 2 in a comparator 3 which may be of the phase, pulse or frequency type. The phase comparator is responsive to frequency differences, and produces a beat frequency as in an ordinary mixer type of device, whereas when the compared frequencies are identical a D.C. voltage is produced. The output of the phase comparator is fed to a scanning oscillator 4 which is designed to oscillate in response to self generated positive feedback signals and incapacitated when only externally controlled feedback signals are applied to it. The scanning oscillator output is fed to the variable frequency oscillator's frequency control element 5, to produce in the variable frequency oscillator a frequency scanning action. When the scanning variable frequency oscillator reaches a frequency comparable or equal to the fixed frequency source, the comparator 3 produces a voltage which effectively disables the scanning oscillator so that its oscillations cease and no further variation of the variable frequency source takes places. The variable frequency oscillator then remains locked to the fixed frequency as in a conventional AFC system.

Figure 2:
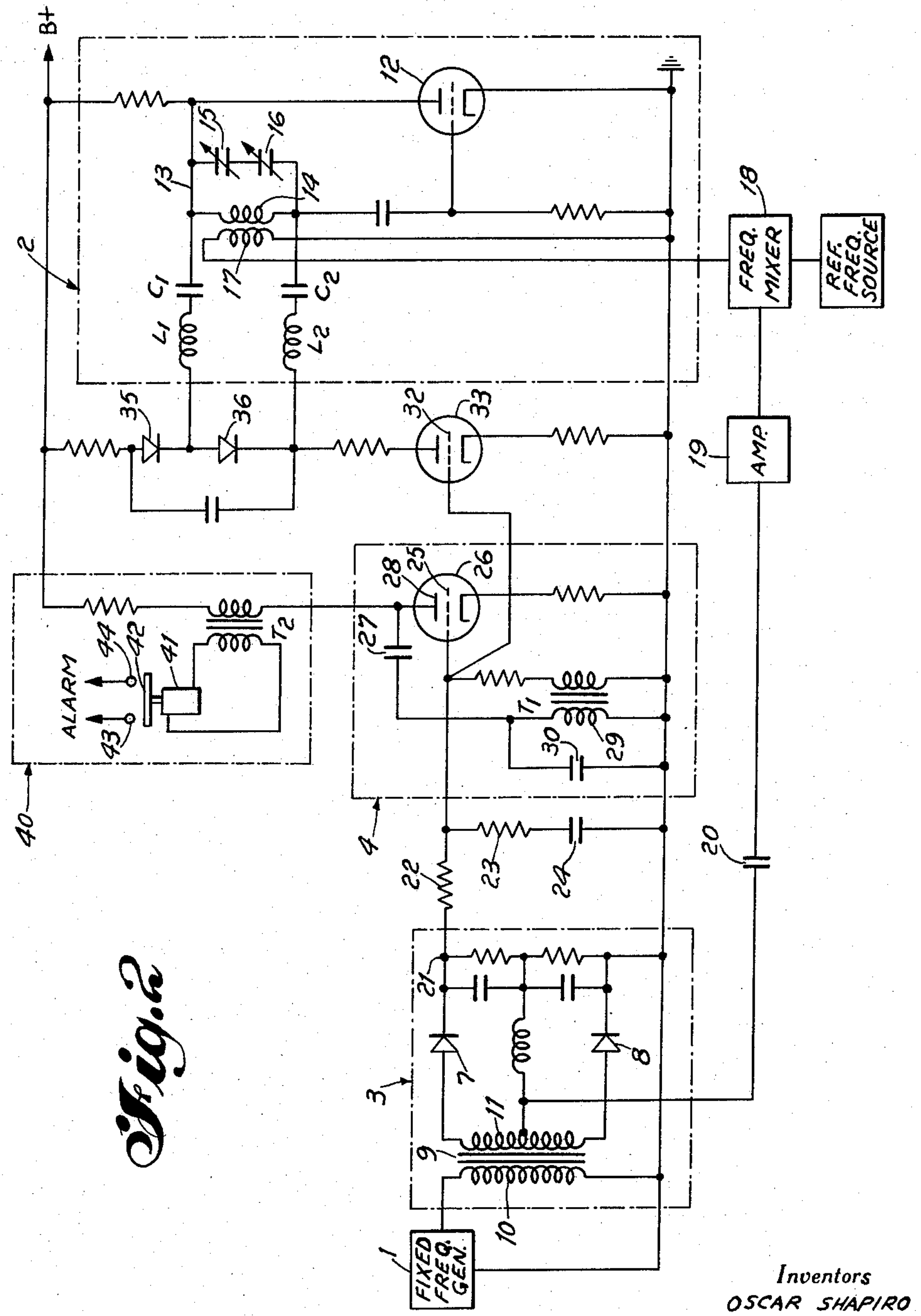
Fig. 2 shows the schematic diagram of the frequency control system illustrated in block form in Fig. 1.

Fig. 2 shows specifically an embodiment of the invention for stabilizing the frequency drift of a variable frequency oscillator and the circuitry for carrying it out. A source of fixed frequency 1 is coupled to a phase comparator 3 which comprises a pair of back-to-back diodes 7, 8 and a transformer composed of a primary 10 and tapped secondary 11. A variable frequency oscillator 2 includes tube 12 and a tuned plate circuit 13, the tuned circuit including the tuning inductors 14 and capacitors 15, 16 which combination determines the frequency values over the scanning range. Any change either directly or indirectly to these frequency determining elements results in a corresponding change of frequency. A sampling coil 17 is magnetically coupled to the tuned circuit coil 14 for receiving the variable frequency signal and transmits the signal to a beat frequency mixer 18, to beat downwardly the signal to a frequency comparable to the frequency of the standard fixed frequency source 1. The signal is then amplified by amplifier 19 and transmitted via capacitor 20 to the center-tap of coil 11, of the transformer 9 which forms a portion of the phase comparator 3. The comparator 3 is a non-linear device and behaves as an ordinary mixer when the fixed and variable frequency sources are not at the same frequency to produce a beat-frequency signal output at the output terminal 21. The resulting beat-frequency signal output appearing at output terminal 21 is partially filtered out by a stabilizing RC network comprised of resistors 22, 23 and capacitor 24 before being fed to the grid 25 of the scanning oscillator tube 26 and to D.C. amplifier tube grid 32. The scanning oscillator 4 comprises a feedback plate-to-grid network, consisting of capacitor 27 and tuned transformer $T_1$, coupling plate 28 to grid 25. The primary 29 of transformer $T_1$ is made to resonate at some low audio frequency with capacitor 30. Whenever any initial signal appears at the grid 25 of scanning oscillator tube 26, the signal is amplified in the plate 28 and fed back to the grid 25 after having been inverted by the transformer $T_1$. This oscillation, created by the arrangement of the feed-back network and the amplitude and polarity of the signal appearing at the grid 25, continues until the oscillator grid signal is finally suppressed to the extent that insufficient feed-back will be present to sustain the oscillations.

A novel method and arrangement for suppressing such grid signals as taught by this invention is provided as follows: any signal appearing at the grid 25 of scanning oscillator tube 26 appears also, because of the direct coupling, at the grid 32 of the D.C. amplifier 33 where the signal is amplified to produce a variation in current in the grid control circuit of the variable frequency oscillator 2. Essentially, any arrangement which effects a change in the reactive tank circuit of the variable frequency oscillator 2, to cause the said oscillator to sweep over a given frequency range, would be permissible. In Fig. 2, a balanced or push-pull network comprised of diodes 35, 36 and $L_1$, $C_1$, $L_2$ and $C_2$, have a reactive effect, whenever there is a current variation in D.C. amplifier 33, on the tuned plate-grid circuit of the variable frequency oscillator 2, to cause the said oscillator to change or scan over a band of frequencies proportional to the amplitude of the current variation and at a rate functionally related to the current variation or swing. As the variable frequency oscillator 2 scans its frequency range it will pass into the pull-in range of the automatic frequency system itself. When this occurs, the comparator 3 will produce a voltage tending to hold or stabilize the variable frequency oscillator at the desired frequency normal to automatic frequency control systems. When the comparator 3 produces such a voltage, i.e. during the period when the system is in lock, the output impedance of the comparator 3 is of a low magnitude. This output impedance which comprises one branch of the parallel load impedance of the scanning oscillator 4 is of such a low magnitude that it effectively represents a short circuit across the grid 26 of the scanning oscillator, thereby causing a cessation of its oscillations. Thus the D.C. voltage produced by the phase comparator then acts upon the frequency control element control tube 32 as in a conventional automatic frequency control system. When the system is not in lock, the output impedance of the phase comparator is of such a high magnitude that it effectively represents an open circuit across the grid of the scanning oscillator and consequently the scanning oscillator will oscillate because of the load impedance presented by the D.C. amplifier and succeeding stages. When the system is thus out of lock, the scanning oscillator causes the reactance of the frequency control elements to vary with a consequential change in the reactance of the variable oscillator's tank circuit 13 thereby causing the variable oscillator 2 to sweep a range of frequencies which are outside of the normal automatic frequency control pull-in range.

Another feature of the invention involves the initiation of an alarm system whenever the automatic frequency control system is inoperative or when the fixed and variable signal frequency sources are not in lock. Fig. 1 shows in block form an alarm indicator 40 operated by scanning oscillator 4 and made to function in response to the oscillator action of the said scanning oscillator. Indicator 40 may comprise any desired form of alarm such as a lamp, buzzer or relay. In Fig. 2, one example of an alarm indicator is shown. When the system is out of lock, the scanning oscillator 4 is oscillating, as previously described, so that the transformer $T_2$ in the plate circuit 28 energizes the A.C. relay 41, thus causing the pole pieces 42 to bridge the contacts 43, 44 which completes the alarm circuit, not shown, the alarm circuit being operative when the said circuit is completed. Any indicator responsive to such alarm circuit completion can be used to thus give the indication of lock-in failure of the frequency system, or of a system not in lock. However, when the frequency system is in lock, the scanning oscillator 4 is inoperative, as previously explained, so that there is no oscillator action or no signal being transmitted to the plate circuit 28. Failure of any oscillatory signal in the said plate circuit renders the relay 41 ineffectual, or de-energized, so that the pole-piece 41 fails to bridge the contacts 43, 44 and opens the alarm circuit, not shown. In the alternative it is possible for the failure alarm to be responsive to a separate oscillator which is rendered operative when the system is out of lock and inoperative when the system is in lock, the alarm indicator giving the appropriate indication accordingly.

Figure 3:
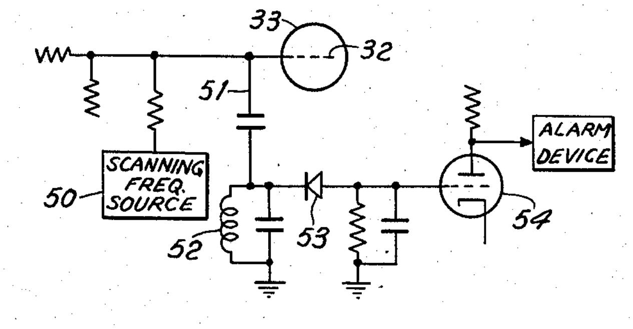
Fig. 3 shows in schematic diagram another embodiment of the invention.

The scanning oscillator 4 may be replaced by a frequency source where some phase modulation of variable frequency oscillator 2 can be tolerated. In Fig. 3 such an embodiment is shown. A scanning frequency source 50 of low audio frequency replaces the scanning oscillator 4 and is coupled to the grid 32 of control tube 33. When the system drops out of lock the voltage of source 50 is sufficent to cause the variable frequency oscillator 2 to sweep through a range of frequencies. When the oscillator 2 enters the pull-in region of the phase comparator 3 the oscillator 2 is caused to lock-in frequency with the fixed frequency generator 1. After the system locks in, the scanning frequency voltage of source 50 continues to be applied to the grid 32 but its effect is substantially neutralized by the negative feed-back inherent in the lock-in phase comparator. The net result is that the system remains in lock but with a small residual phase modulation determined by the feed-back factor of the locked in system. In many installations this residual phase modulation of generator 2 can be tolerated. In the system of Fig. 2 no such residual phase modulation exists and therefore may be preferred in certain installations.

The alarm feature of Fig. 3 comprises a circuit 51 connected to the grid connection of tube 33 and may include, for example, a resonant circuit 52 responsive to the frequency of the scanning frequency source 50. Coupled to circuit 52 is a detector 53 the output of which controls a normally conductive tube 54. An output from detector 53 operates to cut off tube 54 thereby initiating an alarm.

While there have been described what are at present considered to be the preferred embodiments of this invention, it will be obvious to those skilled in the art that various changes and modifications may be made herein without departing from the invention as contemplated herein. The invention, for instance, is not limited to a phase discriminator, but any signal comparator could be used which has for its function the production of a signal responsive to the frequency deviation of a pair of input signals. The scanning oscillator may be of any type circuit whose gain is controllable by the discriminator output. It is therefore aimed in the appended claims to cover all such changes and modifications as fall within the true spirit and scope of the invention.

We claim:

1. An automatic frequency control system comprising a fixed frequency signal source, a variable frequency signal source having a range of frequencies higher than the frequency of said fixed source, a signal comparator coupled to said fixed frequency signal source, coupling means between said variable source and said comparator including a beat frequency mixer beating the output of said variable source down to a frequency comparable to the frequency of said fixed source, whereby said comparator produces a first voltage which is responsive to a phase or frequency difference of the signals of said sources when said sources are in or about to come into lock, coupling means including an oscillator control tube completing a frequency control loop between said comparator and said variable frequency signal source which normally utilizes said first voltage to maintain said variable frequency signal source in lock with said fixed frequency signal source, a source of scanning voltage, said source of scanning voltage comprising a feedback oscillator having at least a plate, a grid and a cathode, the output of said comparator being connected to the grid input circuit of said feedback oscillator, coupling means connecting the grid of said feedback oscillator to the grid of said oscillator control tube, said source of scanning operating in the absence of said first voltage to apply said scanning voltage to said control tube and to cause the latter to vary in frequency in a unidirectional manner toward the center frequency of said variable frequency signal source and thereby search for lock with the frequency of said fixed source and means to remove effectively the application of said scanning voltage from said variable frequency signal source, said means to remove comprising the output impedance of said signal comparator.

2. An automatic frequency control system according to claim 1 wherein said source of scanning voltage is a feedback oscillator and said output impedance of said signal comparator disables said feedback oscillator.

3. An automatic frequency control system according to claim 1 wherein said source of scanning voltage is a feedback oscillator and said output impedance of said signal comparator reduces the effect of said scanning voltage upon said variable frequency signal source.

References Cited in the file of this patent

UNITED STATES PATENTS

| | | |
|---|---|---|
| 2,261,800 | Freeman | Nov. 4, 1941 |
| 2,287,925 | White | June 30, 1942 |
| 2,624,005 | Hansen | Dec. 30, 1952 |
| 2,725,476 | Hugenholtz | Nov. 29, 1955 |
| 2,729,745 | Kenny | Jan. 3, 1956 |
| 2,794,918 | Bourgonjon | June 4, 1957 |